United States Patent [19]
Bryant

[11] Patent Number: 5,899,520
[45] Date of Patent: May 4, 1999

[54] TRUCK SIDE-VIEW MIRROR-MOUNTED SUN SHIELD

[75] Inventor: Brandon Bryant, Lutz, Fla.

[73] Assignee: Sun Shield Technologies, Inc., Land O' Lakes, Fla.

[21] Appl. No.: 08/949,550

[22] Filed: Oct. 14, 1997

[51] Int. Cl.[6] .................................................. B60J 1/20
[52] U.S. Cl. .......................................... 296/152; 296/97.5
[58] Field of Search ................................... 296/152, 97.1, 296/97.2, 97.5, 97.9, 99.1, 91

[56] References Cited

U.S. PATENT DOCUMENTS

| | | |
|---|---|---|
| 1,717,185 | 6/1929 | Caldwell . |
| 2,020,585 | 11/1935 | Stansberry . |
| 2,681,825 | 6/1954 | De Lyra . |
| 2,863,697 | 12/1958 | Watkins . |
| 4,196,930 | 4/1980 | Busche ..................................... 296/91 |
| 4,258,983 | 3/1981 | Johnson ............................. 296/152 X |
| 4,577,929 | 3/1986 | Guillen ................................... 296/91 X |
| 4,844,529 | 7/1989 | O'saben .................................... 296/91 |
| 4,943,103 | 7/1990 | Rosen . |
| 5,058,942 | 10/1991 | Minh . |
| 5,150,258 | 9/1992 | Schmidt et al. . |
| 5,150,941 | 9/1992 | Silzer et al. ............................ 296/152 |
| 5,362,119 | 11/1994 | Rosentratter . |

*Primary Examiner*—D. Glenn Dayoan
*Assistant Examiner*—Chad D. Wells
*Attorney, Agent, or Firm*—James E. Larson; Larson & Larson, P.A.

[57] ABSTRACT

A sun shield is mounted on a bracket that is provided for support of a side-view mirror on a truck cab. The sun shield is mounted horizontally with respect to a ground surface and is located in a position to shield an area just inside the driver's window to protect the arm of the driver from the sun's rays. In the preferred embodiment, the sun shield is made of a high density polymer that is opaque to the sun's rays and is located in a position that does not obstruct the driver's view.

9 Claims, 3 Drawing Sheets

TRUCK SIDE-VIEW MIRROR-MOUNTED SUN SHIELD

BACKGROUND OF THE INVENTION

The present invention relates to a truck side-view mirror-mounted sun shield. In the prior art, sun shields of various sizes and configurations are known. However, Applicant is unaware of any such sun shield including all of the features and aspects of the present invention.

The following prior art is known to Applicant:

U.S. Pat. No. 1,717,185 to Caldwell
U.S. Pat. No. 2,020,585 to Stansberry
U.S. Pat. No. 2,681,825 to De Lyra
U.S. Pat. No. 2,863,697 to Watkins
U.S. Pat. No. 4,943,103 to Rosen
U.S. Pat. No. 5,058,942 to Minh
U.S. Pat. No. 5,150,258 to Schmidt et al.
U.S. Pat. No. 5,362,119 to Rosentratter.

None of these references teaches the concept of a sun shield horizontally disposed above a bracket used to mount a side-view mirror on the driver's door of a truck cab and designed to shield an area from the sun shield to area just inside the cab of the vehicle to shield the driver while not obstructing the driver's view.

SUMMARY OF THE INVENTION

The present invention relates to a truck side-view mirror-mounted sun shield. The present invention includes the following interrelated objects, aspects and features:

(1) In a first aspect, the typical driver's door of a truck cab includes a vertically elongated mirror mounted thereon through the use of heavy brackets. Typically, these brackets include an upper bracket that extends horizontally from the top of the driver's door to a position where it supports the top of the sideview mirror. A lower bracket extends from below the side-view mirror to a position below the window of the driver's door of the truck cab.

(2) The upper bracket, above-described, is typically triangular in configuration having a short leg bolted to the driver's door of the truck cab above the window thereof and having two longer legs extending in a V-shaped configuration converging at an apex where the upper bracket is affixed to a C-shaped bracket that surrounds the mirror and allows the mirror to be adjusted in different orientations.

(3) The inventive sun shield is sized and configured to overlie the V-shaped portion of the upper bracket and an upper leg of the C-shaped bracket and is made in a shape allowing it to overlie a large area between the vertically directed mirror and the window of the driver's door of the truck cab. The shape and configuration of the sun shield is such that the driver of the truck cab is not directly exposed to the sun's rays emanating from the side of the truck where the sun shield is mounted. In this way, the left arm, for example, of the driver is protected not only from heat but also from the negative health effects of the sun's rays, for example, skin cancer.

As such, it is a first object of the present invention to provide a truck side-view mirror-mounted sun shield.

It is a further object of the present invention to provide such a sun shield mounted above an upper bracket supporting a sideview mirror of a truck cab.

It is a further object of the present invention to provide such a sun shield that is horizontally oriented with respect to a ground surface.

It is a still further object of the present invention to provide such a sun shield including a shape and configuration allowing it to block the sun's rays from direct impingement upon the left side of the driver.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 5:
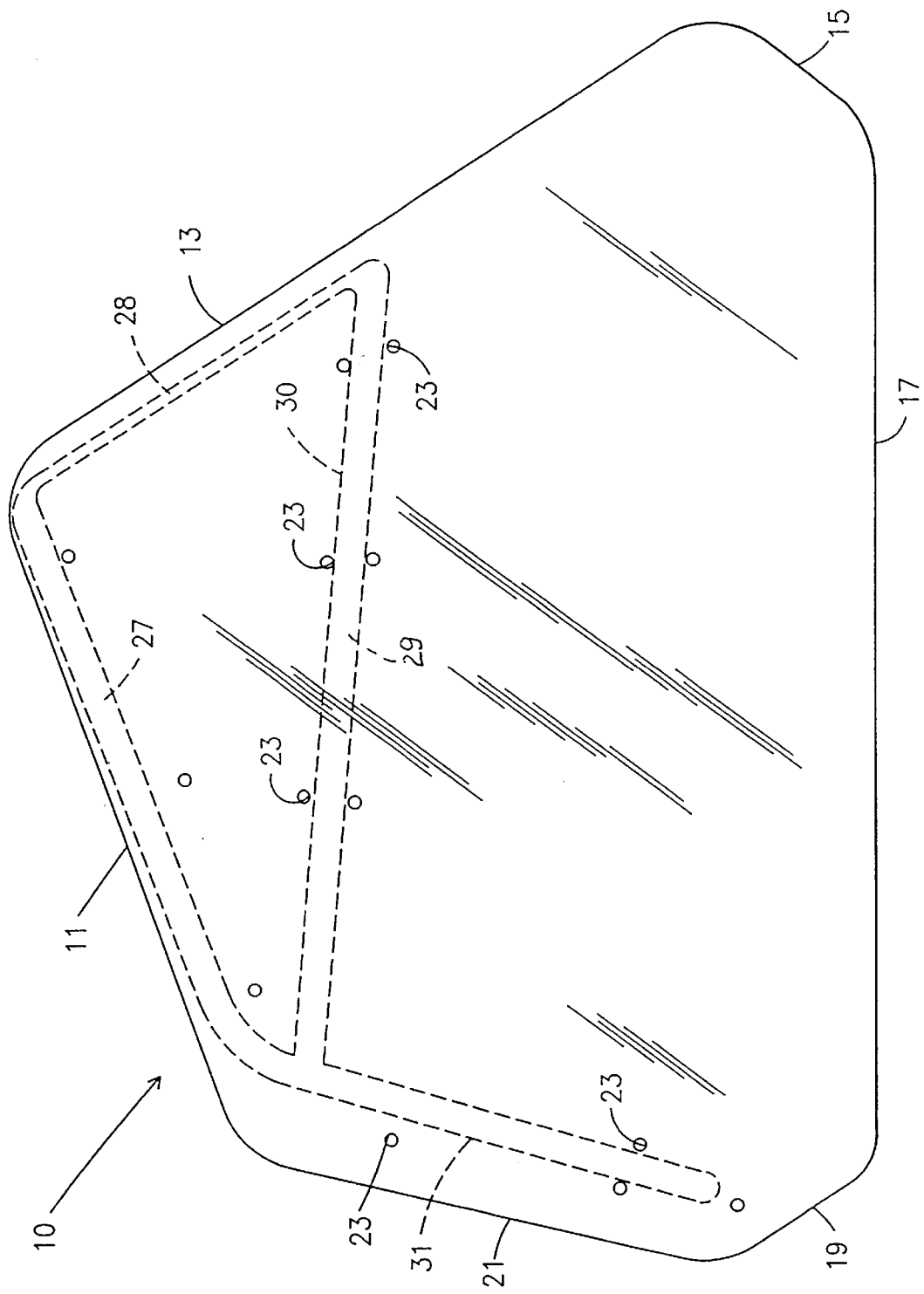
FIG. 5 shows a top view of the sun shield.

With reference, first, to FIG. 5, the inventive sun shield is generally designated by the reference numeral 10 and is seen to be of flat configuration including sides 11, 13, 15, 17, 19 and 21. A plurality of holes 23 are formed through the inventive sun shield 10 for a purpose to be described in greater detail hereinafter.

Figure 1:
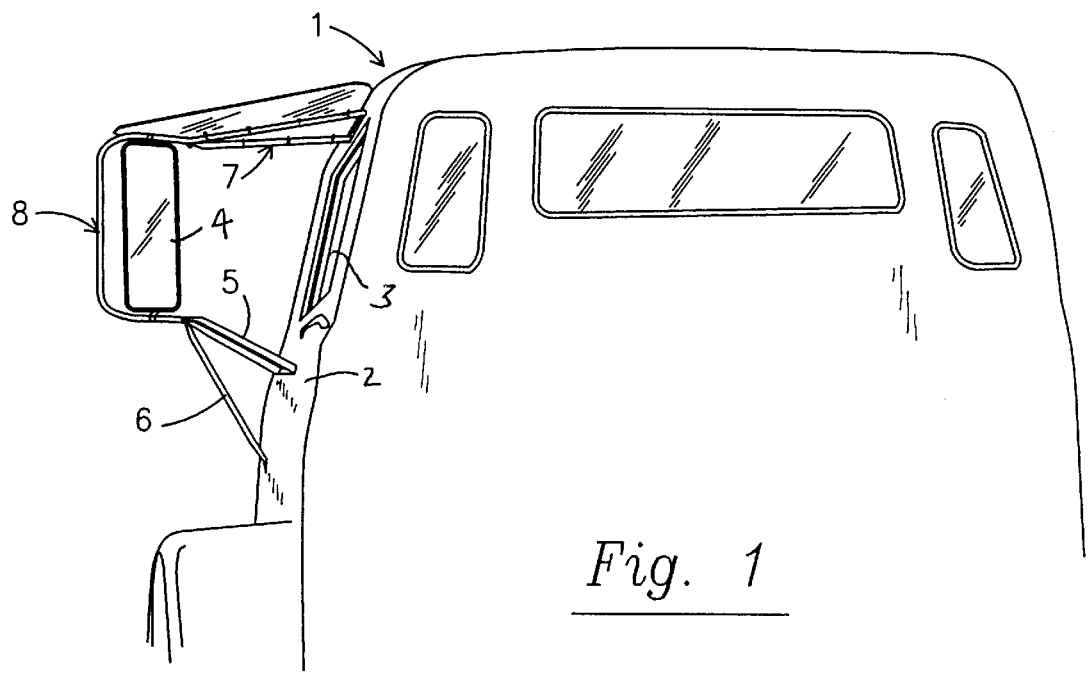
FIG. 1 shows a rear view of a truck cab having a side-view mirror and the present invention mounted thereon.
Figure 2:
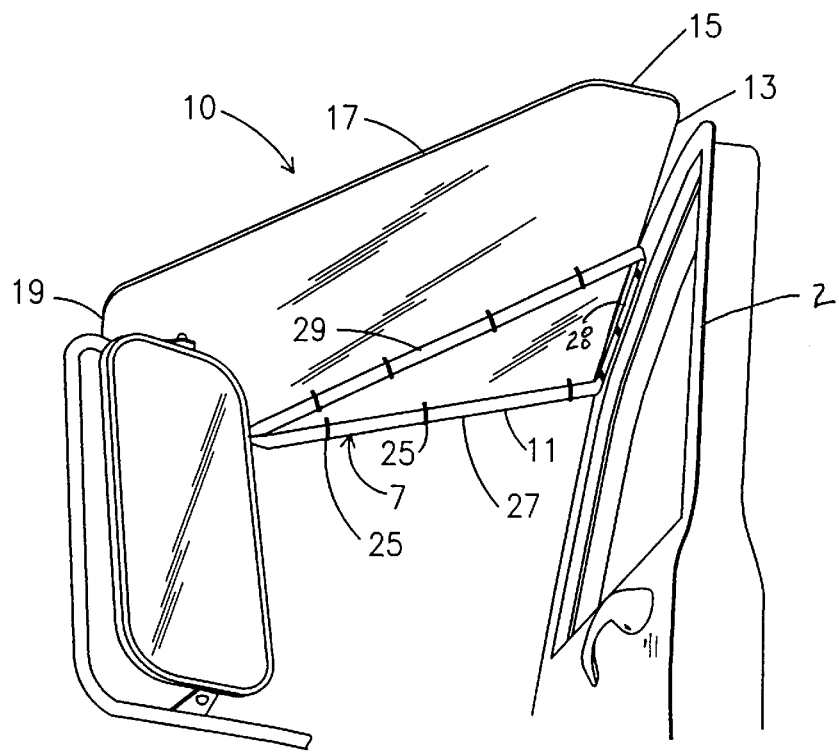
FIG. 2 shows a bottom perspective view of a portion of the truck cab showing further details of the inventive sun shield.
Figure 3:
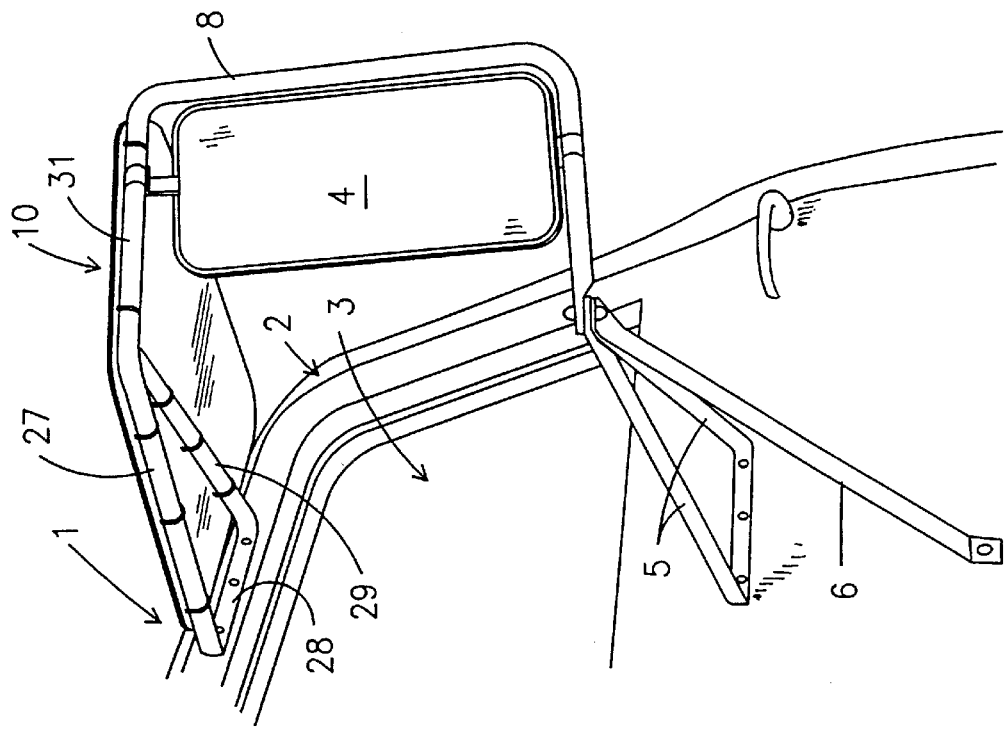
FIG. 3 shows a further rear perspective view of pertinent portions of a truck cab with the inventive sun shield mounted thereon.
Figure 4:
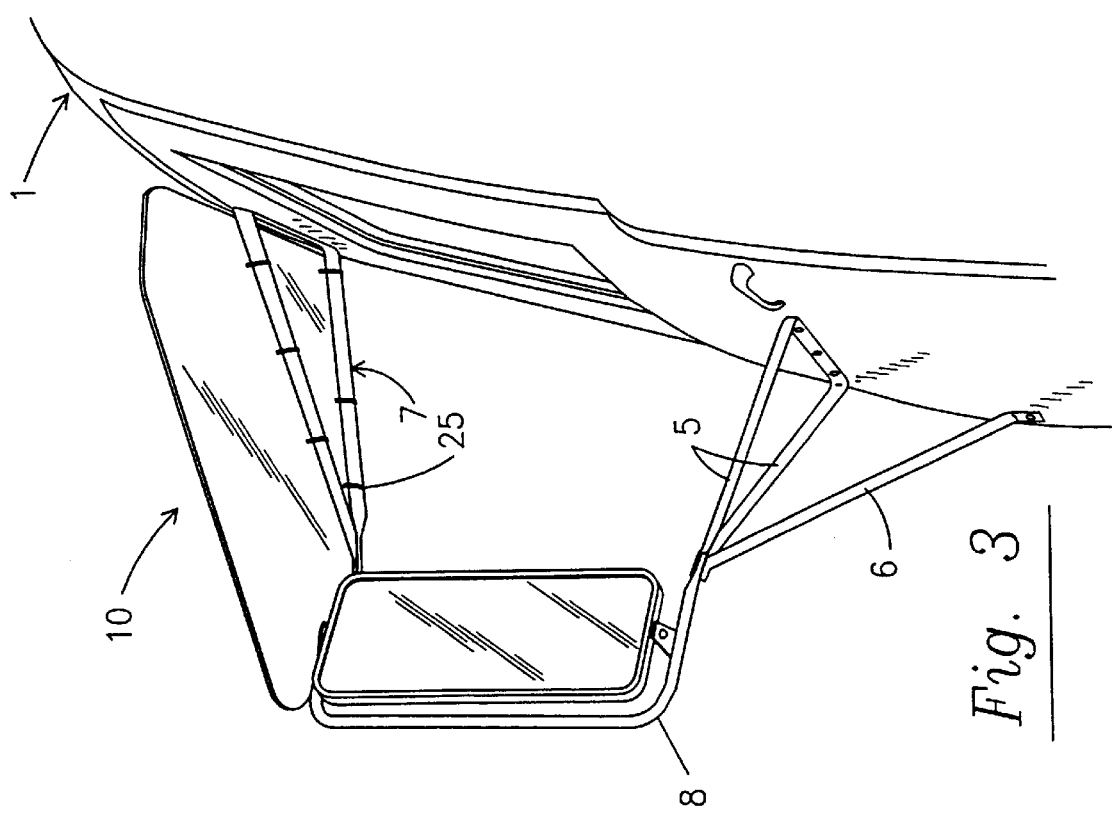
FIG. 4 shows a front side perspective view of the truck cab with the inventive sun shield mounted thereon.

With reference to FIGS. 1–4, a truck cab is generally designated by the reference numeral 1 and is seen to include a driver's door 2 having a window 3. A mirror 4 is mounted on the driver's door 2 through the use of a lower bracket 5 that is triangular in configuration (FIGS. 3 and 4), an angle brace 6 extending from an apex of the lower bracket 5 as seen in FIGS. 3 and 4 and mounted on the surface of the door 2, an upper triangular bracket 7 (FIGS. 1 and 3), and a C-shaped bracket 8 (FIGS. 1, 3 and 4) that interconnects the upper bracket 7 with the lower bracket 5 and supports the mirror 4 therewithin for pivoting movements in various degrees of freedom to permit the driver of the truck cab 1 to adjust the mirror 4 to a suitable position and orientation.

The inventive sun shield 10 is installed on the door 2 by placing it over the upper triangular bracket 7 and a top surface of the C-shaped bracket 8. The holes 23 (FIG. 5) are so located on the sun shield 10 that with the sun shield 10 placed in the position shown in FIGS. 1–4, the holes 23 are aligned with the legs of the bracket 7 in such a way that clips 25 may be mounted about the legs of the brackets 7 and 8 and extend through the holes 23 whereupon they are suitably fastened to firmly fasten the shield 10 in a horizontal orientation (FIGS. 1 and 4) with respect to a level ground surface on which the truck cab is located.

With particular reference to FIG. 2, the upper bracket 7 includes legs 27, 28 and 29 with the leg 28 fastened to the door 2. With particular reference to FIG. 4, the C-shaped bracket 8 has an upper leg 31. With reference, now, to FIG. 5, the legs 27, 28, 29 and 31 are shown in phantom superimposed over the surface of the shield 10 to show their relationships with respect to the holes 23 in the shield 10. Thus, it is seen that the leg 29 is positioned with respect to the shield 10 in such a way that pairs of holes 23 straddle the leg 29 so that a U-shaped fastener may be placed over the leg 29 and through each pair of holes 23 whereupon the U-shaped fastener may be fastened in place. Concerning the leg 27 of the bracket 7, this leg 27 is located with respect to the shield 10 along the edge 11 thereof so that the holes 23 adjacent thereto can receive a fastener that extends over the leg 27 over the edge 11 of the shield 10 and is suitably fastened together. Concerning the leg 31 of the C-shaped bracket 8, one pair of holes 23 straddles the leg 31 while other holes 23 are to either side of the leg 31 so that suitable fasteners may be employed to fasten the shield thereto. Of course, these hole configurations are merely exemplary and any suitable hole patterns and configurations may be provided to allow firm fastening of the inventive sun shield 10 in a horizontal orientation over the legs 27, 29 of the bracket 7 and over the leg 31 of the bracket 8.

In the preferred embodiment of the present invention, the inventive sun shield 10 may be made of any suitable firm rigid material such as high density pole plastic, or more particularly, acrylic, either made in a suitable aesthetically pleasing color or of a "smoked" appearance. The preferred embodiment employs an opaque bronze colored shield, but alternate colors, for example gray, may be employed. The sun shield 10 being opaque thereby blocks a substantial portion of the light rays from passing therethrough. Alternate embodiments may employ a translucent sun shield.

Accordingly, an invention has been disclosed in terms of a preferred embodiment thereof which fulfills each and every one of the objects of the invention as set forth hereinabove and provides a new and useful truck side-view mirror-mounted sun shield of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. In a vehicle having a passenger compartment and an access door for a driver, said door having a window, and a mirror mounted on said door including an upper bracket connected between said mirror and said door, the improvement comprising a sun shield consisting of a flat opaque plate mounted horizontally onto said upper bracket, said sun shield covering a portion of an area between said mirror and door.

2. The sun shield of claim 1, wherein said upper bracket is generally triangular, including a first leg affixed to said door above said window, and second and third legs attached at opposed ends of said first leg and to each other remote from said door.

3. The sun shield of claim 2, mounted above said bracket.

4. The sun shield of claim 3, including a multiplicity of holes therethrough and fasteners extending through said holes to fasten said sun shield to said upper bracket.

5. The sun shield of claim 1, made of high density polymer plastic.

6. The sun shield of claim 1, wherein said vehicle further includes a C-shaped bracket interposed between said upper bracket and said mirror, said C-shaped bracket having an upper portion to which said sun shield is also mounted.

7. In a truck having a truck cab with a passenger compartment and an access door for a driver, said door having a window, and a mirror mounted on said door including an upper bracket connected on said door above said window, a C-shaped bracket connected to said upper bracket, and said mirror adjustably connected to said C-shaped bracket, the improvement comprising a sun shield consisting of a flat opaque plate mounted horizontally above said upper bracket and C-shaped bracket, said sun shield covering a portion of an area between said mirror and door.

8. The sun shield of claim 7, including a multiplicity of holes therethrough and fasteners extending through said holes to fasten said sun shield to said upper bracket and C-shaped bracket.

9. The sun shield of claim 7, made of high density polymer plastic.

* * * * *